No. 785,016. PATENTED MAR. 14, 1905.
A. E. MATTERN.
COVER FOR FLAT IRONS.
APPLICATION FILED MAY 14, 1904.

Anna E. Mattern, Inventor

Witnesses

By Victor J. Evans, Attorney

No. 785,016. Patented March 14, 1905.

UNITED STATES PATENT OFFICE.

ANNA E. MATTERN, OF MILESBURG, PENNSYLVANIA.

COVER FOR FLAT-IRONS.

SPECIFICATION forming part of Letters Patent No. 785,016, dated March 14, 1905.

Application filed May 14, 1904. Serial No. 207,979.

*To all whom it may concern:*

Be it known that I, ANNA E. MATTERN, a citizen of the United States, residing at Milesburg, in the county of Center and State of Pennsylvania, have invented new and useful Improvements in Covers for Flat-Irons, of which the following is a specification.

This invention relates to covers for flat-irons and the like, the object of the invention being to provide an article of the character referred to which will cover one or more irons while resting upon a stove or other heater and confine the heat around the iron or irons, so as to save time in bringing the irons to the required temperature for laundry purposes. The article also serves to keep the irons clean.

With the above and other objects in view the invention consists in the novel construction, combination, and arrangement of parts, as herein fully described, illustrated, and claimed.

Figure 1:
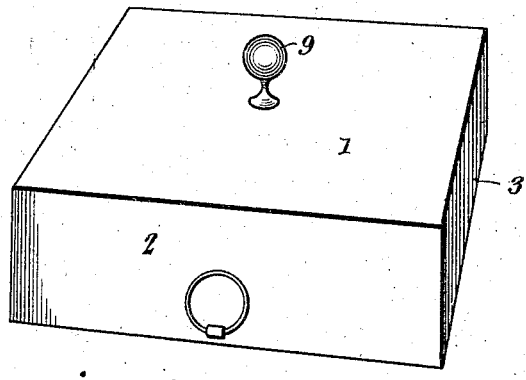
Figure 2:
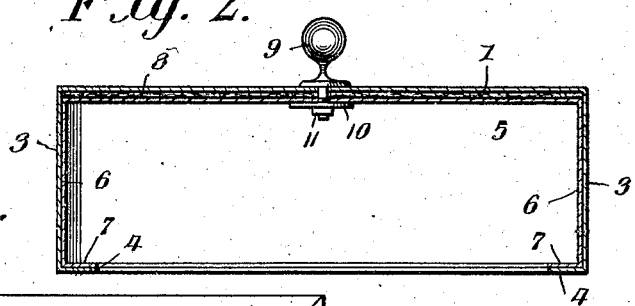
Figure 3:
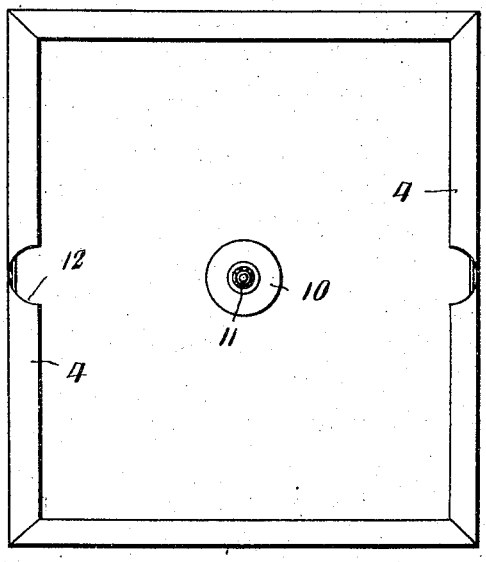

In the accompanying drawings, Figure 1 is a perspective view of a cover constructed in accordance with the present invention. Fig. 2 is a vertical sectional view of the same. Fig. 3 is a bottom plan view thereof.

Like reference-numerals indicate corresponding parts in all the figures of the drawings.

While the cover contemplated in this invention is for the purpose of illustration shown of square or rectangular form, it will be apparent that the cover as a whole may be oval, oblong, or round or that any other desired shape may be imparted thereto, and the cover as a whole may be of any desired size, according to the capacity to be given thereto and the number of irons to be embraced by the cover, the cover being designed to be placed over one or more irons while resting or heating upon the top of the stove.

In the preferred embodiment of this invention the cover comprises an outer casing consisting of the top 1, the sides and ends 2 and 3, and an inturned flange 4, extending along the bottom edges of the sides and ends, as shown in Figs. 2 and 3. Within the outer casing is arranged an inner casing consisting of the top 5, the sides and ends 6, and an inturned bottom flange 7, which is practically coextensive with the flange 4 and which rests thereon, as shown in Fig. 2. Sufficient space is left between the top 1 of the outer case and the top 5 of the inner case to admit of the introduction of an asbestos sheet-lining 8, which prevents the too-rapid radiation of heat from the cover. The outer and inner casings are perforated about centrally of the top to receive the threaded shank of a knob or handle 9, which shank passes through both outer and inner casings and the lining and also through a washer 10, arranged within the inner case and held in place by a nut 11 on the shank of the knob, as clearly shown in Fig. 2.

The flanges 4 are preferably formed integrally with the sides and ends of the cover by simply bending the lower edges of the sides and ends inward, as indicated in Figs. 2 and 3. The flanges 7 of the inner casing are preferably formed in the same way. The outer flanges 4 are by preference notched, as shown at 12, in order to provide for accessibility to the inner casing whenever necessary. The flanges 4 and 7 are useful when it is necessary to move the cover and slide the irons to a different position or point on the top of the stove without removing the cover, the said flanges engaging the irons at their lowermost points, and thus sliding the irons without liability of tipping the same over. The flanges also form a flat seat or rest for the cover and aid in excluding dust, soot, and ashes from the irons being heated, thus keeping the irons clean and in proper condition for use.

Having thus described the invention, what is claimed as new is—

A cover for the purpose specified comprising an outer casing consisting of top, sides and ends, an inner casing arranged therein, a lining sheet of asbestos interposed between the outer and inner casings, and an inturned flange extending from the lower edge of the outer casing, substantially as and for the purpose set forth.

In testimony whereof I affix my signature in presence of two witnesses.

ANNA E. MATTERN.

Witnesses:
J. W. ZIMMERMAN,
LORENA BELLE MATTERN.